United States Patent

Ching

[11] Patent Number: 5,443,582
[45] Date of Patent: Aug. 22, 1995

[54] WHEEL CAPS

[76] Inventor: Sheu L. Ching, No. 39-65, Ta Jen Temple, Ta Jen Village, Kuei Jen Hsiang, Tainan Hsien, Taiwan

[21] Appl. No.: 202,585

[22] Filed: Feb. 28, 1994

[51] Int. Cl.$^6$ .............................................. B60B 7/14
[52] U.S. Cl. ................................ 301/37.37; 301/37.26
[58] Field of Search ................ 301/37.1, 37.26, 37.31, 301/37.32, 37.33, 37.34, 37.35, 37.36, 37.37, 37.38

[56] References Cited

U.S. PATENT DOCUMENTS

| | | | |
|---|---|---|---|
| 2,044,654 | 6/1936 | Whited | 301/37.37 X |
| 2,722,822 | 11/1955 | Thomas | 301/37.37 X |
| 4,083,606 | 4/1978 | Scruggs | 301/37.38 X |
| 4,932,724 | 6/1990 | Wright | 301/37.37 |
| 4,971,396 | 11/1990 | Morris | 301/37.37 |
| 5,358,813 | 10/1994 | Polka | 301/37.37 |

FOREIGN PATENT DOCUMENTS

| | | | |
|---|---|---|---|
| 111891 | 12/1928 | Austria | 301/37.37 |
| 421000 | 4/1991 | European Pat. Off. | 301/37.37 |

*Primary Examiner*—Russell D. Stormer
*Attorney, Agent, or Firm*—Morton J. Rosenberg; David I. Klein

[57] ABSTRACT

A wheel cap, formed of an aluminum alloy, is provided. The wheel cap includes a plurality of holes formed in a centrally disposed circular recess, adapted to secure the wheel cap to a wheel by means of fasteners and at least a pair of fixture members. The holes of the wheel cap are arranged to accommodate wheels having bolt circles of different diameters.

4 Claims, 9 Drawing Sheets

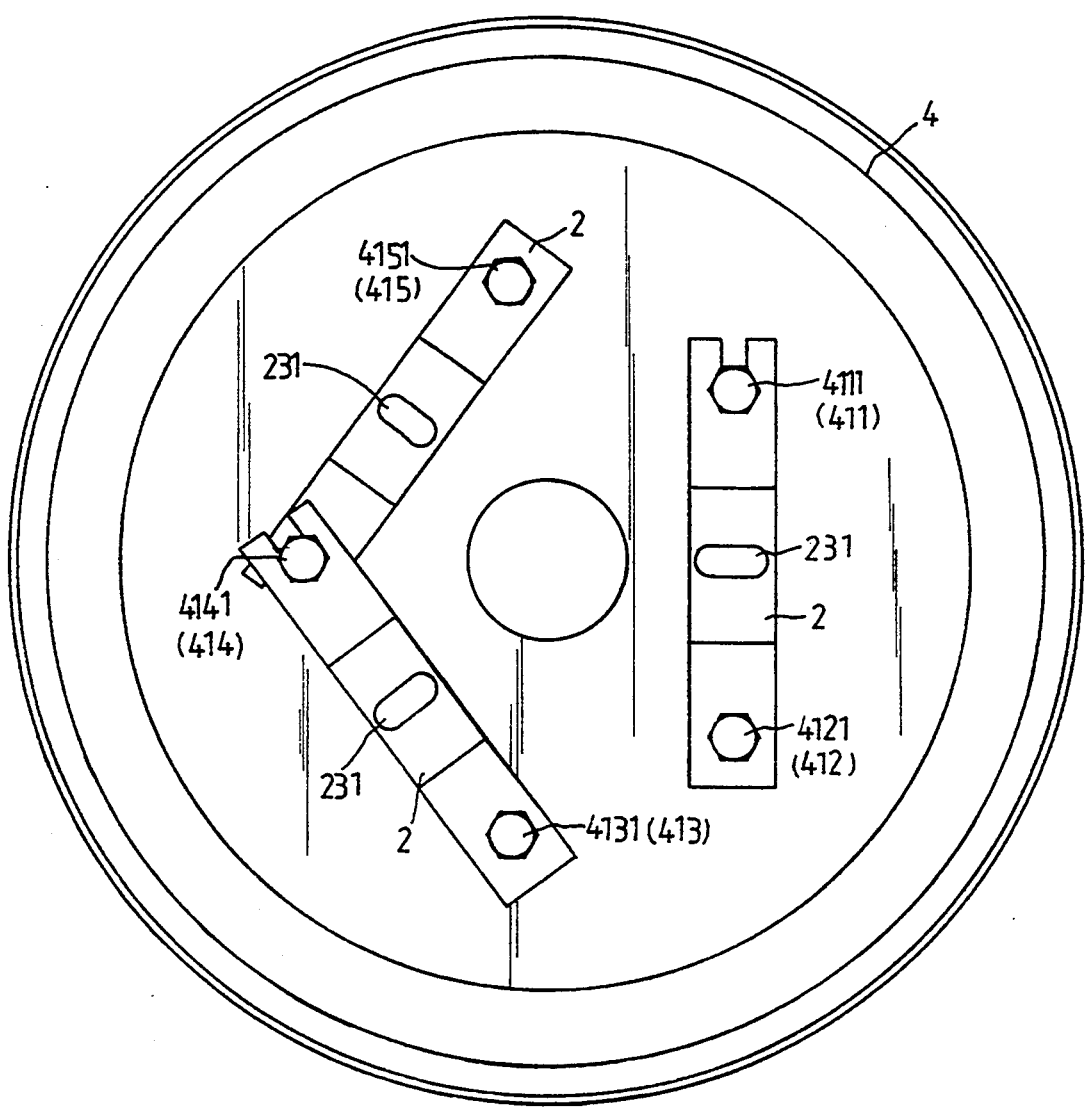
F I G. 5

5,443,582

WHEEL CAPS

BACKGROUND OF THE INVENTION

FIELD OF THE INVENTION

This invention relates to wheel caps and more particularly to aluminum alloy wheel caps that are suitable for installation on all kinds of wheels.

PRIOR ART

Most auto makers install wheel caps on their new cars as one of the standard equipment items. Wheel caps are generally mounted to wheels by one of two different methods. The first method is to snap-fit the wheel caps to the wheel, which requires that a plurality of integrally formed clips be included on the periphery of the wheel cap to snap into a circular groove of the wheel rim. The second method of mounting the wheel caps uses bolts and nuts, as shown in FIGS. 8 and 9. The wheel cap A has a hollow center portion, at least three arms A1 extending outwardly, and a bolt B extending from the center portion of the wheel cap A. Each arm A1 has an aperture A11 adapted to receive a bolt extending from an axle. The bolt B extending outward from the wheel cap A is adapted to be threadedly connected with a nut C. The disadvantage of the first mounting method is that the wheel cap may easily come off the wheel when the wheel hits an object when the vehicle is being driven. The shortcoming for the second method of attachment is that different models of vehicles have different bolt circle diameter and different wheel depths, especially front wheel drive vehicles or the vehicles which are made in Japan, which have shallower wheel depths and therefore, the wheel cap A cannot be mounted very close to the central portion of the wheel.

SUMMARY OF THE INVENTION

A wheel cap is provided which has a primary object to be suitable for mounting on vehicles of many different models.

It is another object of the present invention to provide a wheel cap which has good heat dissipation characteristics.

It is a further object of the present invention to provide a wheel cap which is inexpensive to produce.

BRIEF DESCRIPTION OF THE DRAWINGS

FIG. 5 is an elevation view showing three fixtures of the present invention being mounted on a wheel having five bolts;

DETAILED DESCRIPTION OF THE PREFERRED EMBODIMENT

Figure 1:
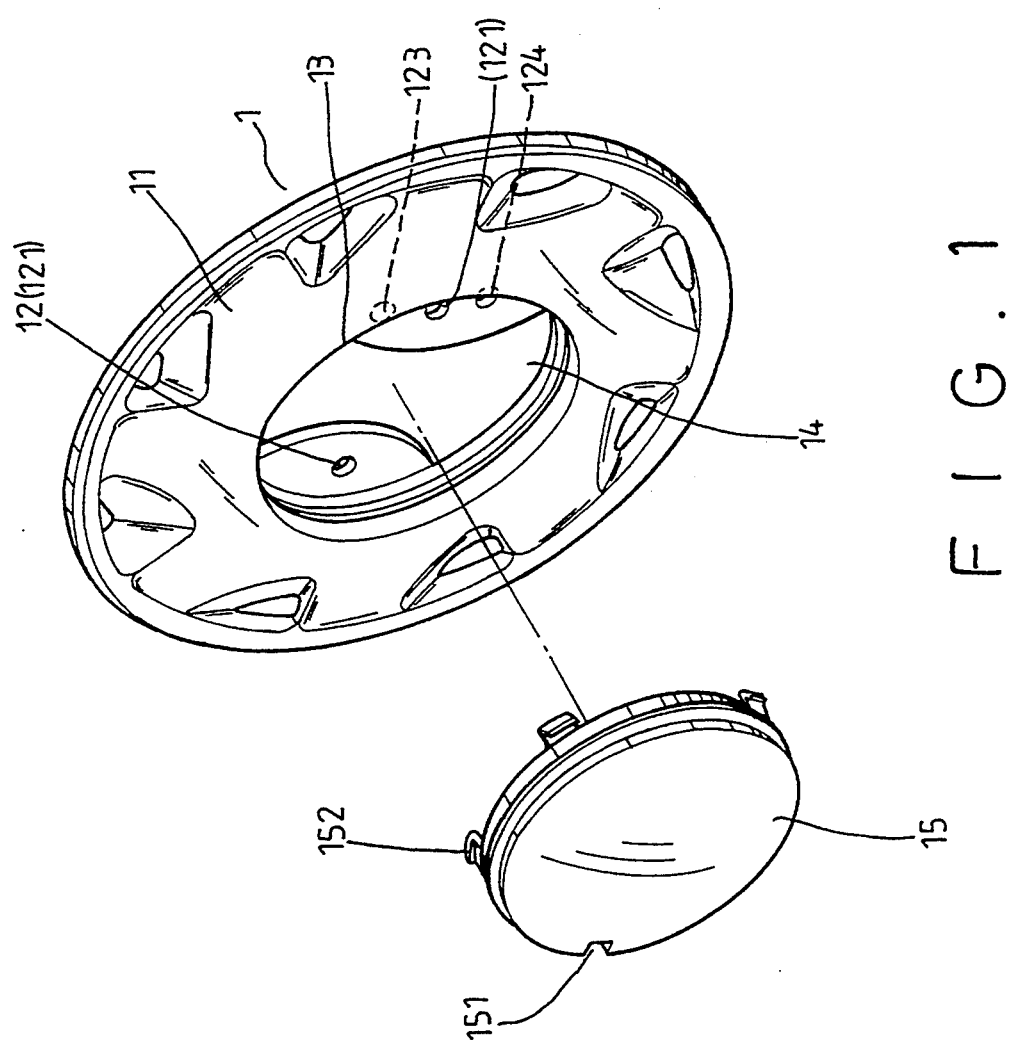
FIG. 1 is a perspective view of the present invention.
Figure 2:
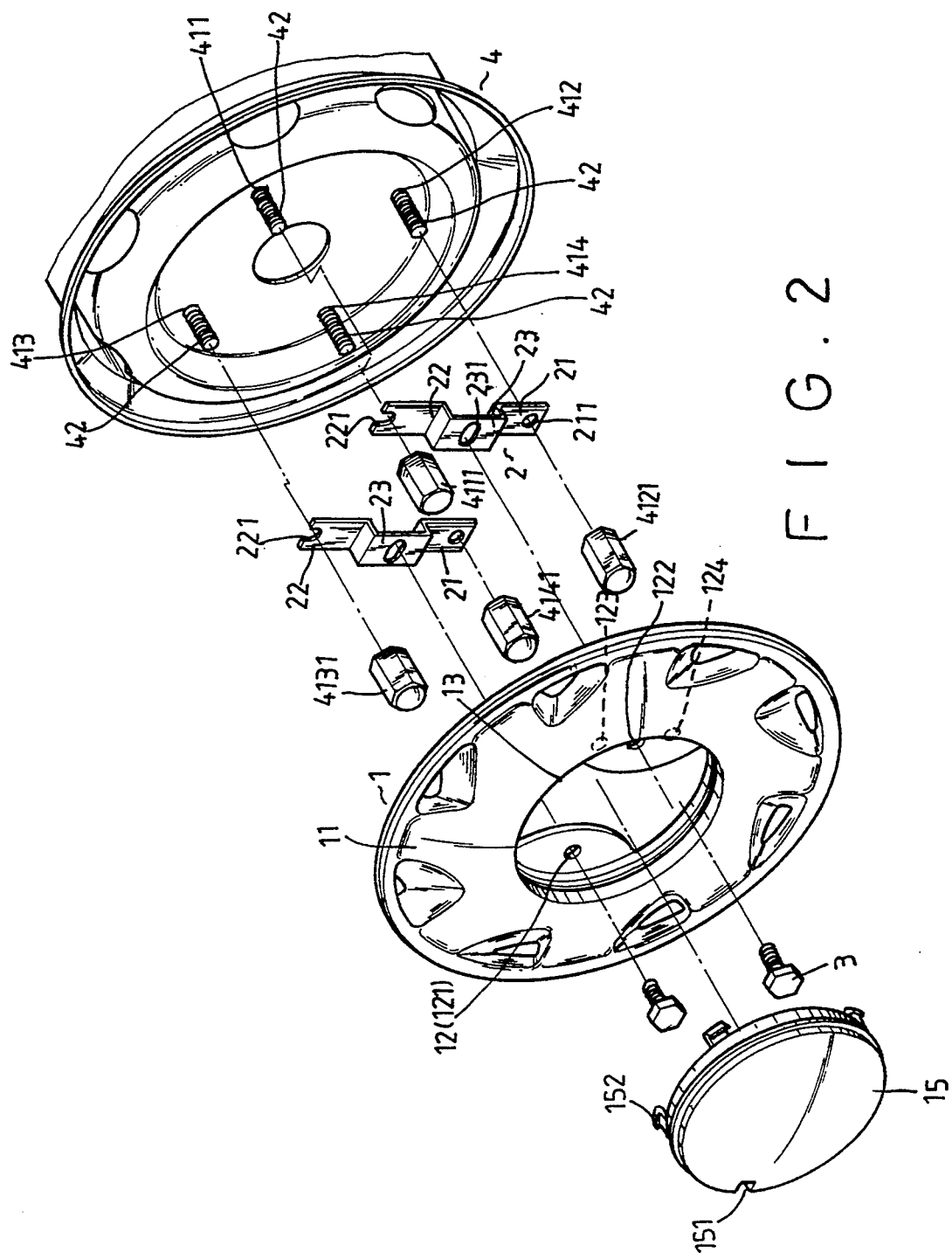
FIG. 2 is a perspective exploded view of the present invention showing the installation sequence.

Referring now to the drawing Figures, where such drawings are provided for the purpose of illustrating a referred embodiment only and not for the purpose of limiting the same, FIGS. 1 and 2 show a wheel cap 1 and at least a fixture 2.

The wheel cap 1 has decorative bulging portions 11, a plurality of apertures 121, 122, 123 and 124 on an indented area at center of the cap 1. A circular groove 13 is formed in the inner edge of the indented area, and an aperture 14 is formed at the center thereof. A cover 15 is provided which is sized to be received within the indented area.

The wheel cap 1 is formed of a metal, such as an aluminum alloy, primarily by a casting method. The bulging portions are formed by this first procedure. The cap 1 is later finished by pressing, and then performing fine cutting by a lathe, to form a shiny and smooth appearance.

The apertures 123 and 124 are disposed at respective sides of either aperture 121 or 122 and at an angle of 36 degrees with respect to a line drawn from aperture 121 directly to aperture 122.

The fixture 2 is generally a rectangular member having both ends downwardly offset, such that the endmost 21, 22 are disposed in parallel relation with the top or raised center portion 23. A notch 221 is formed in one end 22 of the fixture 2 and an aperture 211 is formed through the other end 21. An oval aperture 231 is formed through the top center portion 23. The notch 221 and the aperture 211 are fastened by bolts 42 and nuts 4111, 4121, 4131 and 4141 to the wheel 4. The oval aperture 231 is adapted to secure the wheel cap 1 by means of bolts 3 respectively inserted through apertures 121 and 122 and through the oval apertures 231, the bolts 3 being fastened with nuts.

Figure 3:
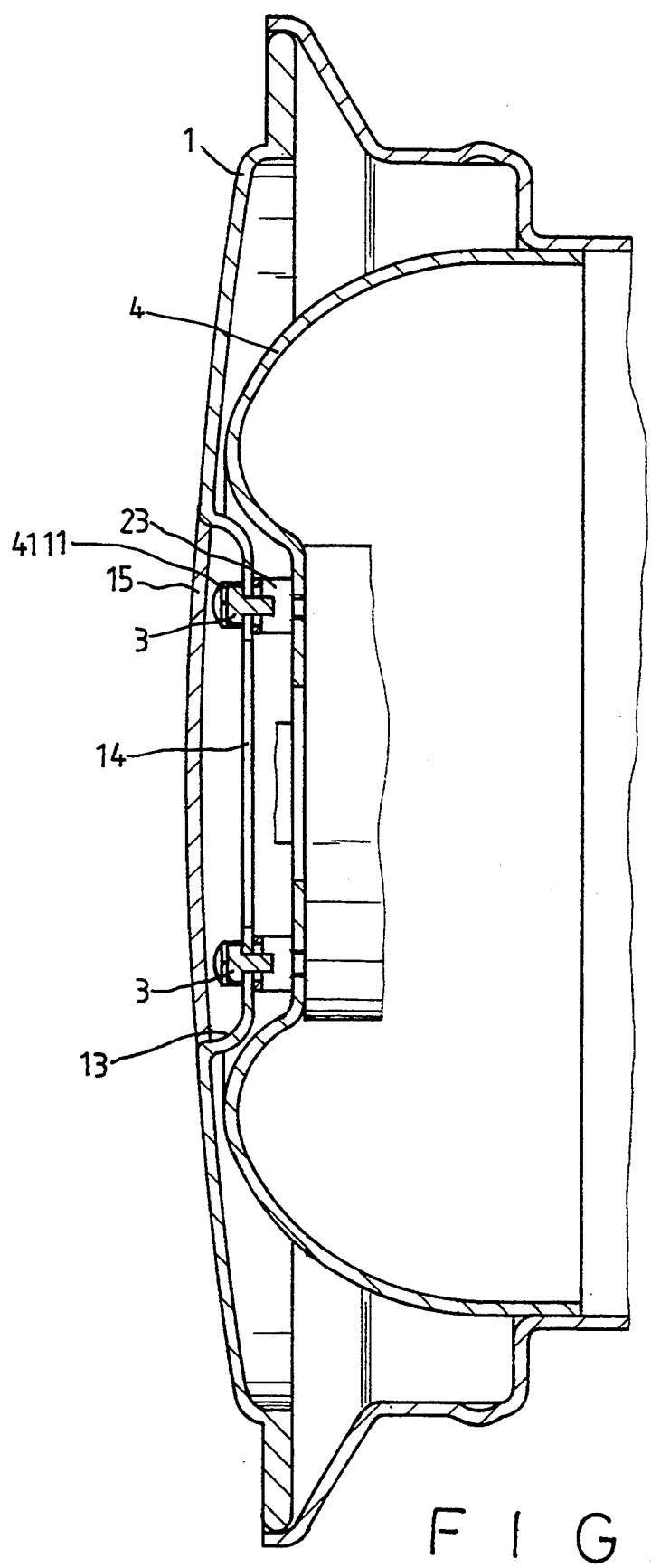
FIG. 3 is a cross-sectional side elevation view of the present invention.

By the above method, the wheel cap 1 is fastened to the wheel 4 securely, as shown in FIG. 3. The cover 15 may be mounted to the wheel cap 1 by pushing the cover 15 toward the wheel cap 1. The slips 152 which are integrally formed on the periphery of cover 15, are snap-fit into the circular groove 13. A notch 151 formed in one side of the cover 15 is provided to aid in removing the cover 15 from the wheel cap 1, by inserting a finger or other object into the notch 151 and a force to pry the cover 15 from wheel cap 1.

Figure 4:
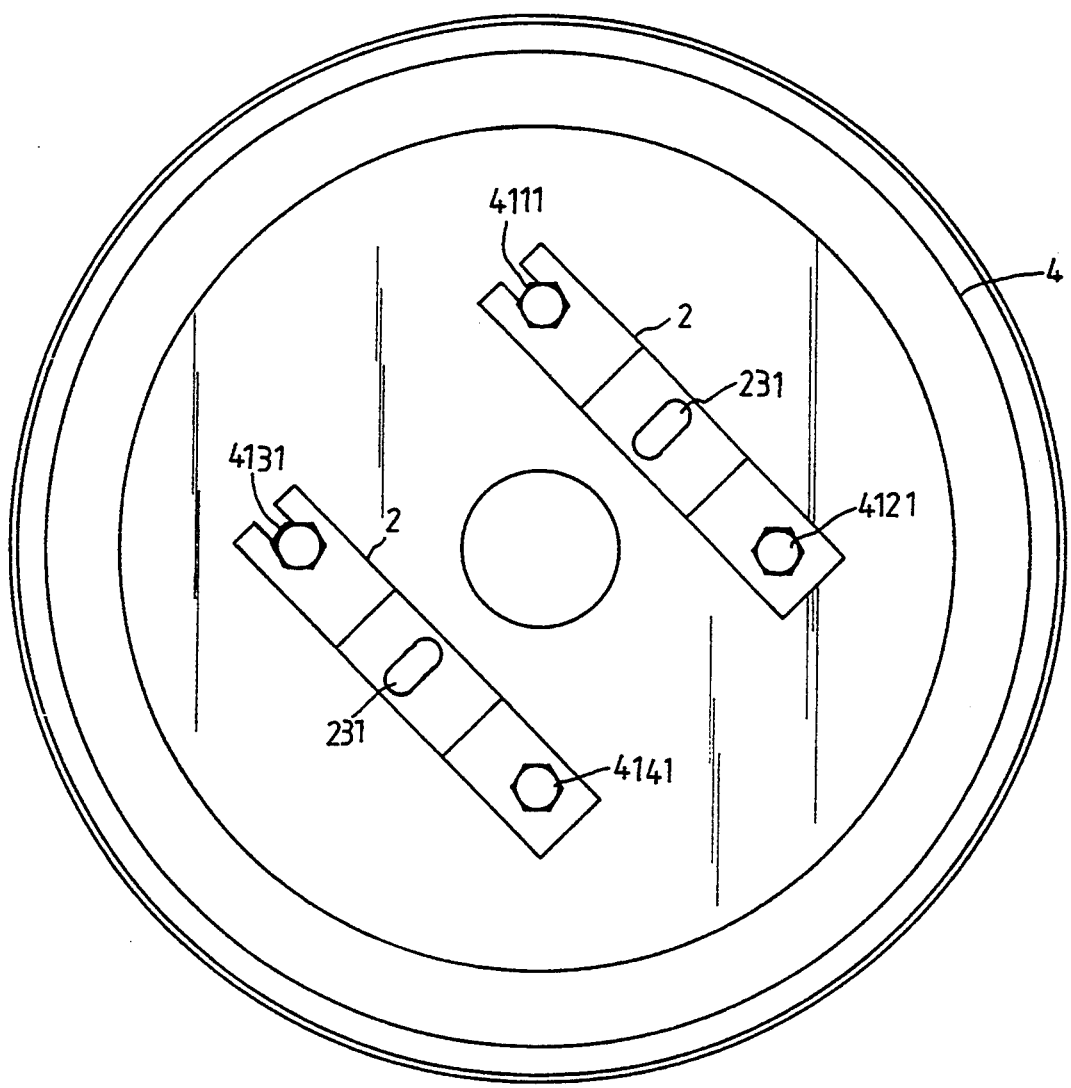
FIG. 4 is an elevation view showing two fixtures of the present invention being fastened to four bolts of the wheel, respectively.

To mount the wheel cap 1 to the wheel 4, which has four apertures 411, 412, 413 and 414, as shown in FIG. 4, first the fixtures 2 are secured on the wheel 4 by bolts 42. One end of each of the bolts is inserted into the respective female threaded apertures 411, 412, 413 and 414 of the wheel, the other ends of which extend outwardly therefrom. The bolts extend through the respective apertures 211 and the notches 221, and are then fastened by nuts 4111, 4121, 4131 and 4141. The wheel cap 1 is then placed on the wheel 4 with the apertures 121, 122 aligned with the oval apertures 231 of the fixtures 2 and fastened with screws 3.

To mount the wheel cap 1 to a wheel 4 having five apertures 411, 412, 413, 414 and 415, as shown in FIG. 5, three fixtures 2 are used by stacking two notches 221 together on a bolt 4141.

Figure 6:
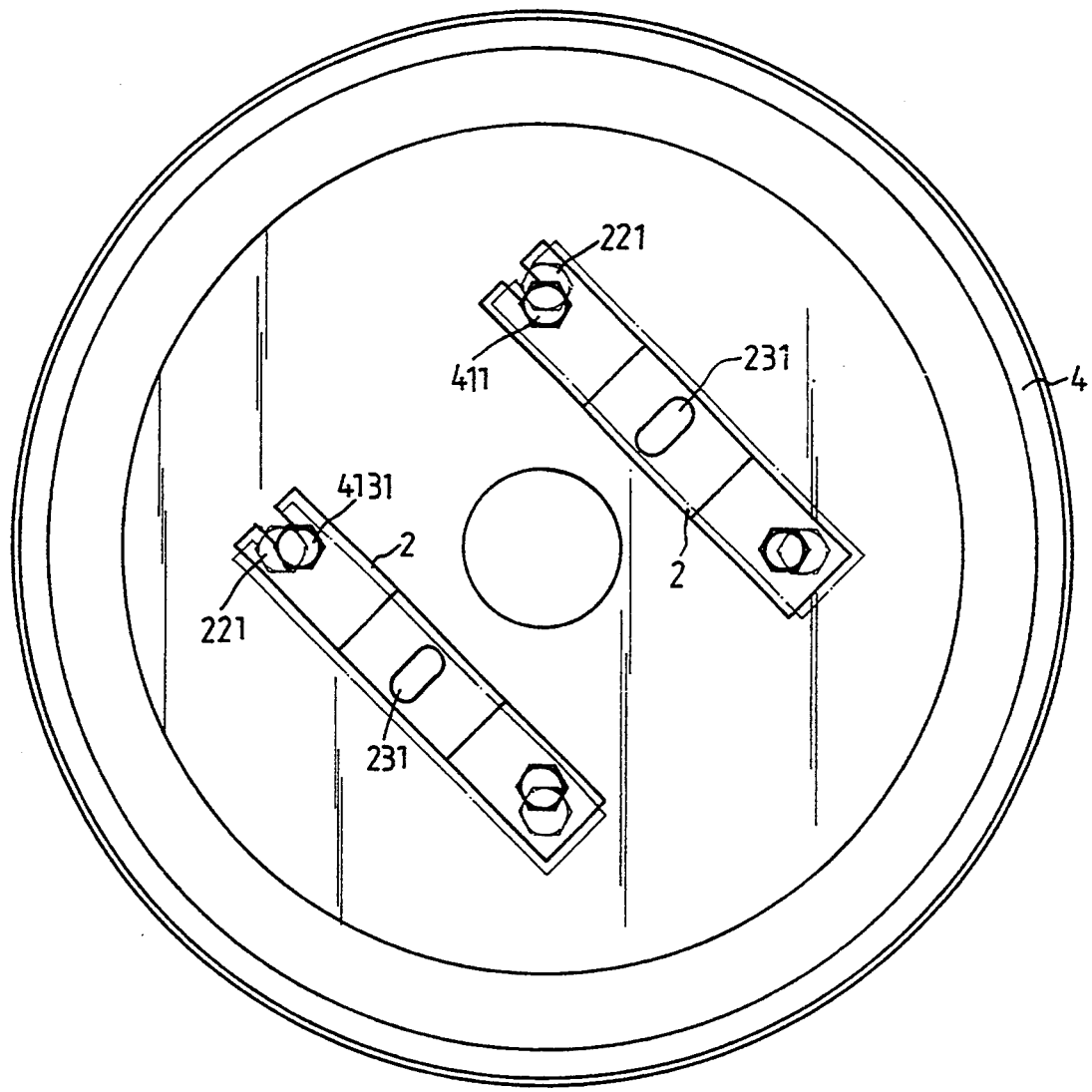
FIG. 6 is an elevation view of the present invention, demonstrating the adjusting method of the fixtures.
Figure 7:
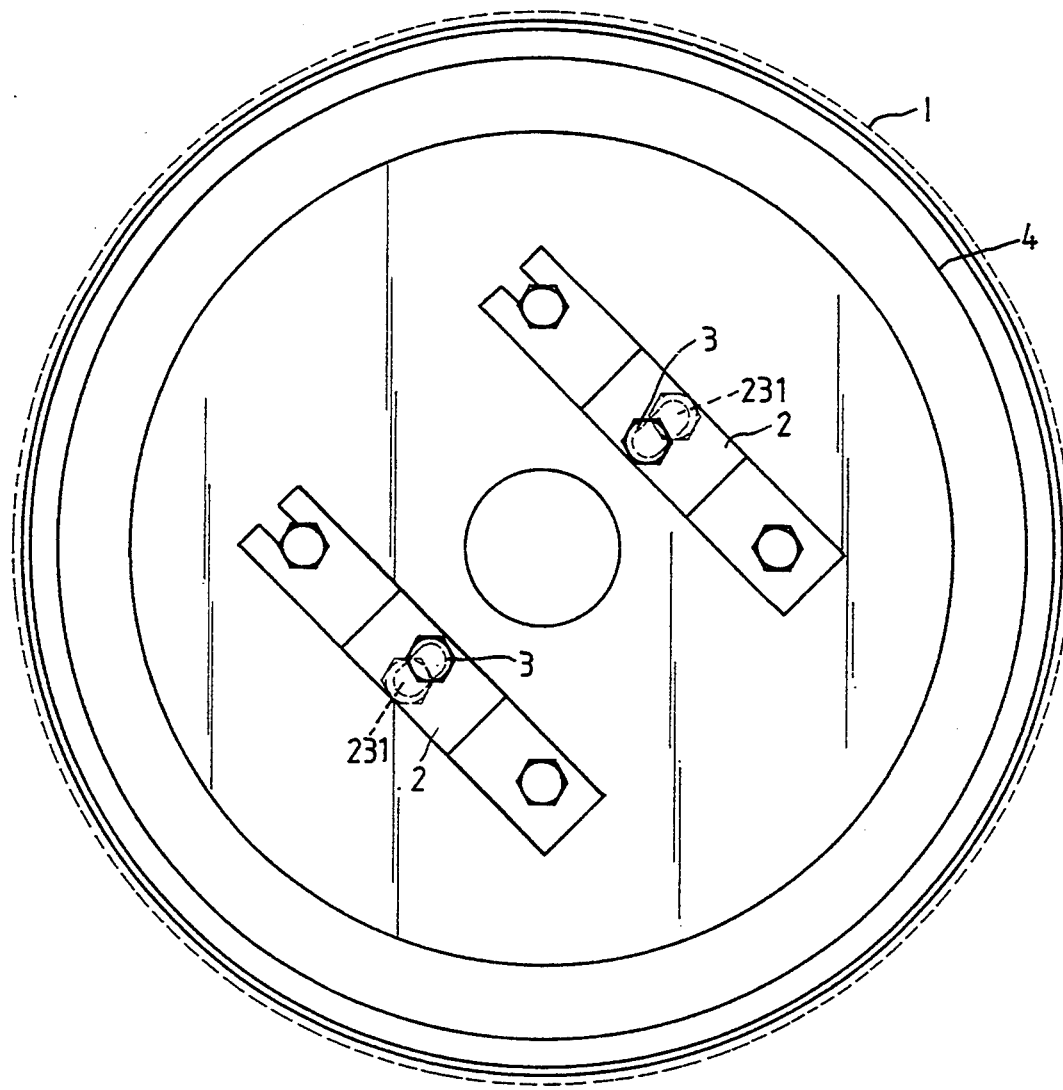
FIG. 7 is an elevation view of the present invention, further demonstrating adjusting method of the fixtures.
Figure 8:
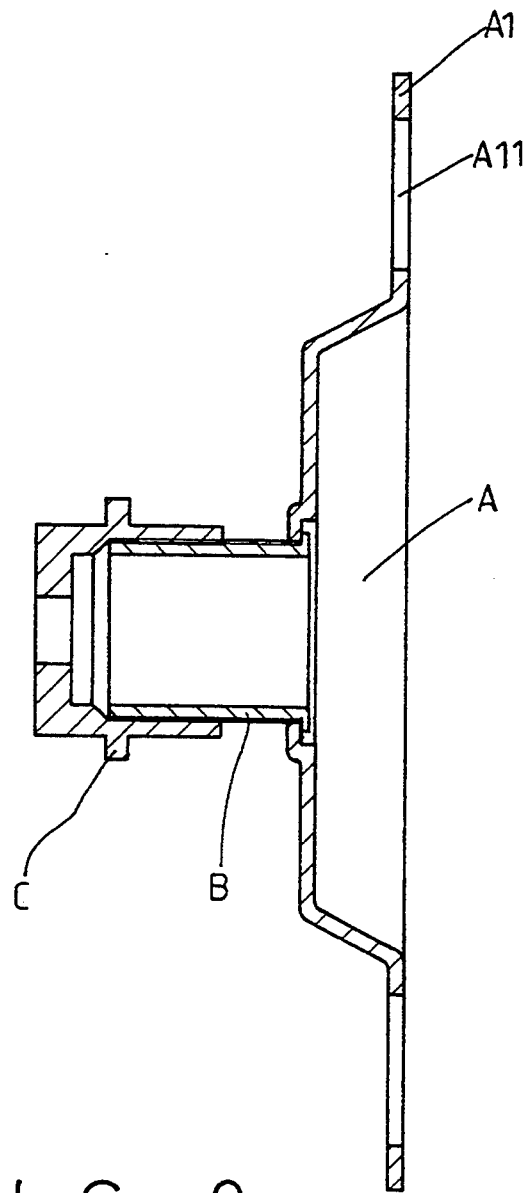
FIGS. 8 and 9 show prior art wheel caps.
Figure 9:
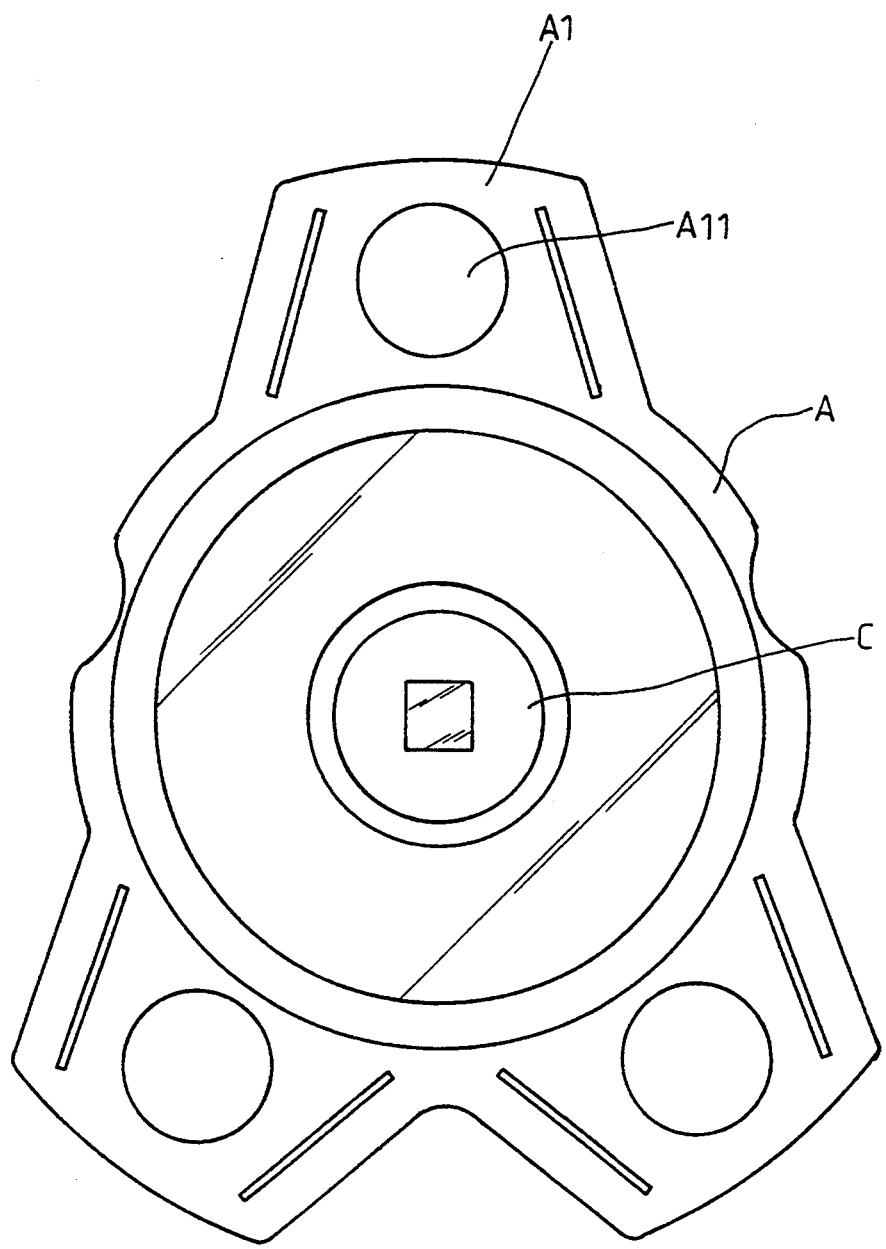

Because different vehicles have different bolt patterns, the position of the fixture 2 is adjustable, as shown in FIG. 6. Additionally, the oval aperture 231 has a long slot that will also provide an adjustable character to the wheel cap 1 as shown in FIG. 7.

I claim:

1. A wheel cap assembly, comprising:

a wheel cap member having bulging portions formed on an external surface thereof, said wheel cap member having a centrally disposed circular recess defined by a cylindrical wall, said cylindrical wall having an annular groove formed therein, said circular recess is further defined by a bottom wall having a centrally disposed aperture formed therethrough and a pair of first through bores formed on opposing sides of said aperture and defining a first axis therebetween, said bottom wall having a pair of second through bores disposed on opposing sides of one of said pair of first through bores and defining a second axis therebetween, said second axis being disposed at an angle of 36 degrees with respect to said first axis; and, at least two fixture members adapted for threaded engagement with a vehicle's wheel, each of said fixture members having a raised central portion disposed in spaced parallel relation with respect to a pair of opposing end portions thereof, said raised central portion having a slotted through opening formed therein for securement of said wheel cap member to said fixture member by a threaded fastener passing through one of said first or second through bores, each of said fixture members having a through opening formed in one said pair of opposing end portions and a slotted opening in the other of said end portions for coupling with a vehicle wheel by a threaded fastener passed therethrough.

2. The wheel cap assembly as recited in claim 1 where both said through opening and said slotted opening formed in said end portions of each said fixture members are dimensioned to be larger than the respective threaded fasteners that pass therethrough to a location of said fixture member on a vehicle wheel to be adjusted.

3. The wheel cap assembly as recited in claim 1 further comprising a cover member for forming a closure for said circular recess, said cover member having clips formed on a peripheral portion thereof for engagement with said annular groove.

4. The wheel cap assembly as recited in claim 1 where said wheel cap member is formed of an aluminum alloy.

* * * * *